United States Patent [19]

Zidovec et al.

[11] Patent Number: 5,368,740
[45] Date of Patent: Nov. 29, 1994

[54] METHODS OF CONTROLLING SCALE FORMATION IN THE PRESENCE OF METAL IONS IN AQUEOUS SYSTEMS

[75] Inventors: Davor F. Zidovec; Alexander D. Fisher, both of Jacksonville, Fla.

[73] Assignee: Betz PaperChem, Inc., Jacksonville, Fla.

[21] Appl. No.: 52,303

[22] Filed: Apr. 23, 1993

[51] Int. Cl.⁵ ............................ C02F 5/10; C02F 5/14
[52] U.S. Cl. ............................. 210/697; 162/38; 162/45; 210/698; 210/701; 252/180; 252/181
[58] Field of Search ........................... 162/29, 42, 45; 210/698-701, 697; 252/180, 181

[56] References Cited

U.S. PATENT DOCUMENTS

| | | | |
|---|---|---|---|
| 3,405,060 | 10/1968 | Carter et al. | 210/698 |
| 3,696,044 | 10/1972 | Rutledge | 210/698 |
| 3,790,610 | 2/1974 | Lum et al. | 210/698 |
| 4,443,340 | 4/1984 | May et al. | 210/698 |
| 4,749,550 | 6/1988 | Goldie et al. | 422/19 |
| 4,872,995 | 10/1989 | Chen et al. | 210/699 |
| 5,057,228 | 10/1991 | Breen et al. | 210/700 |
| 5,062,962 | 11/1991 | Brown et al. | 210/698 |
| 5,130,052 | 7/1992 | Kreb et al. | 252/387 |
| 5,248,438 | 9/1993 | Perez | 210/701 |
| 5,256,332 | 10/1993 | Kessler | 210/698 |
| 5,271,847 | 12/1993 | Chen et al. | 210/698 |

*Primary Examiner*—Peter A. Hruskoci
*Attorney, Agent, or Firm*—Alexander D. Ricci; Steven D. Boyd

[57] ABSTRACT

A method of inhibiting scale formation in acidic aqueous systems where metal ions such as $Al^{+3}$ or $Fe^{+3}$ are present by employing a polyepoxysuccinic acid in combination with a metal ion binding material.

3 Claims, No Drawings

METHODS OF CONTROLLING SCALE FORMATION IN THE PRESENCE OF METAL IONS IN AQUEOUS SYSTEMS

FIELD OF THE INVENTION

The present invention relates to the treatment of water to inhibit the formation of scale. More particularly, the present invention relates to a treatment for aqueous systems which controls scale deposition in the presence of metal ions.

BACKGROUND OF THE INVENTION

Although the present invention has general applicability to any given aqueous system where the formation and deposition of scale and in particular barium sulfate is a potential problem, the invention will be discussed in detail as it concerns paper making systems. The present invention relates to methods for inhibiting scale deposition and fouling in aqueous systems.

The water employed in papermaking systems often contain dissolved salts of barium, calcium, magnesium, etc., which can lead to scale and sludge deposits. These materials can be present in the water at it's source or enter the system with the wood or pulp. In papermaking systems barium sulfate deposition has detrimental effects on papermaking, affecting paper quality, screening efficacy and production rates. Inhibitors are often employed to control barium sulfate scales. Currently, products such as polyphosphates and polyacrylates as well as polyepoxy succinic acid (PESA) are employed as inhibitors.

In paper machines operating in an acid environment, $Al^{+3}$ is present in concentrations of up to 20 mg $Al^{+3}$ per liter of process water to promote paper sizing and increased paper machine drainage. The presence of $Al^{+3}$ has been found to markedly reduce the efficacy of scale control products including PESA. Other metal ions that may be present as contaminants such as $Fe^{+3}$ have a similar detrimental effect.

Scale can also cause rapid localized corrosion and subsequent penetration of metallic surfaces through the formation of differential oxygen concentration cells. The localized corrosion resulting from differential oxygen cells originating from deposit is commonly referred to as underdeposit corrosion.

The treatment of industrial waters to inhibit scale formation with polyepoxysuccinic acid (hereinafter PESA) is disclosed in U.S. Pat. No. 5,062,962. The general formula for PESA is:

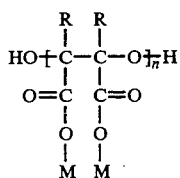

where n ranges from about 2 to 50, preferably 2 to 25, and M is hydrogen or a water soluble cation such as $Na^+$, $NH_4^+$ or $K^+$ and R is hydrogen, C 1-4 alkyl or C 1-4 substituted alkyl (preferably R is hydrogen). However, it was found that when PESA was employed in an acidic paper machine where $Al^{+3}$ was present in substantial concentrations, the scale control efficacy of PESA was markedly reduced.

In addition to PESA, other scale control agent such as polyphosphates and polyacrylates were found to exhibit limitations in efficacy in such an environment. Polyphosphates function as both scale inhibitors and metal ion binders. A high dose of a polyphosphate may overcome the interference of $Al^{+3}$ of $Fe^{+3}$ however, the cost would be prohibitive. The combination of the present invention provides a scale inhibitor which is effective at low dosages when combined with a low cost metal ion binding agent.

The scale control efficacy of PESA was also found to be decreased by the presence of acrylic acid copolymers in aqueous systems as described in copending application Ser. No. 07/827246 filed Jan. 28, 1992 now U.S. Pat. No. 5,248,438.

SUMMARY OF THE INVENTION

The present invention provides an effective method of inhibiting scale formation in an acidic aqueous system in the presence of metal ions such as $Al^{+3}$ or $Fe^{+3}$ by employing PESA in combination with a metal ion binding material. The method of the present invention enhances the efficacy of PESA and avoids the problems of interference between PESA and other scale control materials in acidic environments which include metal ions such as $Al^{+3}$ or $Fe^{+3}$.

The present invention is effective at inhibiting the deposition of scale forming materials such as barium sulfate. The method of the present invention comprises treating an acidic aqueous system having metal ions such as $Al^{+3}$ or $Fe^{+3}$ present with a combination of polyepoxysuccinic acid of the general formula:

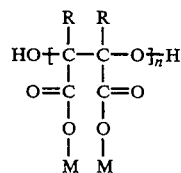

where n ranges from about 2 to 50, preferably 2 to 25, and M is hydrogen or a water soluble cation such as $Na^+$, $NH_4^+$ or $K^+$ and R is hydrogen, C 1-4 alkyl or C 1-4 substituted alkyl (preferably R is hydrogen); and a metal ion binding agent such as polyacrylates, citric acid, and tartaric acid.

In the present invention, the polyepoxysuccinic acid is added to an acidic aqueous system including metal ions such as $Al^{+3}$ or $Fe^{+3}$ at substoichiometric levels to inhibit the scale formation. The metal binding agent is added to avoid a decreased efficacy of the PESA due to the presence of the metal ions. The metal binding agent is added in an amount sufficient to inhibit. these adverse effects.

DESCRIPTION OF THE PREFERRED EMBODIMENTS

The present invention pertains to a novel method of inhibiting the formation of scale such as barium sulfate in aqueous systems. Specifically, the method of the present invention comprises adding to an aqueous system a treatment solution comprising a combination of a polyepoxysuccinic acid of the general formula

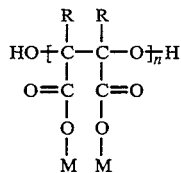

where n ranges from about 2 to 50, preferably 2 to 25, and M is hydrogen or a water soluble cation such as $Na^+$, $NH_4^+$ or $K^+$ and R is hydrogen, C 1-4 alkyl or C 1-4 substituted alkyl (preferably R is hydrogen); and a metal ion binding agent such as polyacrylates, citric acid, and tartaric acid.

Polyepoxysuccinic acids are known to provide scale inhibition and are effective in a wide variety of water systems. U.S. Pat. No. 5,062,962 outlines a method of preparing the polyepoxysuccinic acid material of the present invention. The treatment levels of polyepoxysuccinic acid added to an aqueous system can range from about 25 parts per billion up to about 500 parts per million. The preferred treatment levels range from about 5 parts per million up to about 100 parts per million. The concentration of polyepoxysuccinic acid necessary to provide effective scale control will vary from system to system. The treatment level will vary in part, with changes in temperature and pH. However, in all cases, the concentration of polyepoxysuccinic acid added to an acidic aqueous system in accordance with the present invention is at substoichiometric concentrations. That is, the concentration of polyepoxysuccinic acid added is much lower than the concentration of the scale forming material in the system to be treated.

The metal binding agents of the present invention are those known to be effective in acidic aqueous systems for binding ions such as $Al^{+3}$ or $Fe^{+3}$. Exemplary binding agents include sodium tripolyphosphate and polyacrylic acid. Also included are binding agents such as citric acid and tartaric acid.

It was found that in acidic aqueous environments where metal ions such as $Al^{+3}$ were present, the combination of polyepoxysuccinic acid and a metal binding agent was effective at reducing scale formation and deposition. Individually, the polyepoxysuccinic acid and metal binding agents were significantly less efficacious at inhibiting scale formation and deposition. See Table 1. The metal binding agent can be added to the aqueous system in concentrations ranging from about 2 up to about 50 parts per million depending upon the concentration of interfering metal ions.

The present invention will now be described with reference to a number of specific examples which are to be regarded solely as illustrative and not as restricting the scope of the present invention.

EXAMPLES

Dynamic scale inhibiting testing was undertaken by means of an apparatus in which aqueous solutions of $Ba(NO_3)_2$, and $Na_2SO_4$ and $AlCl_3$ were blended and pumped through a stainless steel capillary column. The aqueous solutions were prepared so as to reproduce concentrations, pH's and temperatures typically encountered in a paper machine. The scaling process was monitored by measuring the pressure required to pump the solution, at constant flow, through the column. As scale deposits, resistance to flow increases and the pumping pressure required to maintain a constant flow increases. A second measure of the scaling rate was obtained by chemical analysis of barium present in the solution exiting the column.

The efficacy of the treatment solutions added to the circulating aqueous system was measured based upon the slope of a pressure increase versus time plot. Percent inhibition based upon slope was calculated according to the equation $$\% \text{ Inh (slope)} = \frac{\text{Slope (untreated)} - \text{Slope (treated)}}{\text{Slope (untreated)}} \times 100$$

% Inhibition based upon measurement of barium concentration was determined according to the equation $$\% \text{ Inh (Ba)} = \frac{[\text{Ba, treated}] - [\text{Ba untreated}]}{[\text{Ba, initial}] - [\text{Ba untreated}]} \times 100$$

Test conditions for the inhibition studies reported in Table 1 were: Temperature 30° C., pH 4.3, $SO_4$ concentration 1000 ppm, Ba concentration 2 ppm, Al concentration 3 ppm, Table 1 summarizes percent inhibition values for a variety of treatment solutions and dosages.

TABLE 1

| | Barium Sulfate Inhibition Values | | |
|---|---|---|---|
| Product(s) | Dose(s) (ppm) | % Inhibition (slope) | % Inhibition (Ba) |
| STPP | 20 | 0 | 0 |
| Coag 88D | 10 | 9 | 0 |
| PESA | 5 | 60 | 32 |
| PESA/STPP | 5/5 | 59 | 47 |
| PESA/Coag 88D | 5/5 | 70 | 71 |
| PESA/citric acid | 5/10 | 85 | 72 |

STPP: Sodium tripolyphosphate
Coag 88D: Polyacrylic acid (available from Betz Laboratories of Trevose, PA)

An additional metal ion binding agent, which is normally present in industrial PESA solutions as a consequence of the manufacturing process is tartaric acid. It was found that the efficacy of inhibiting $BaSO_4$ scale deposition in the presence of $Al^{+3}$ ions increased with increasing tartaric acid concentration as shown in Table II.

TABLE 2

| | Barium Sulfate Inhibition Values | | |
|---|---|---|---|
| Product | % Tartaric Acid | Dose (ppm Active) | % Inhibition (slope) |
| PESA I | 4.23 | 5 | 51 |
| PESA II | 5.95 | 5 | 68 |
| PESA I | 4.23 | 10 | 84 |
| PESA II | 5.95 | 10 | 100 |

As can be seen from Tables 1 and 2 the combination of PESA and a metal ion binding agent inhibits scale deposition in acidic aqueous environments where metal ions are present.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true scope and spirit of the present invention.

We claim:

1. A method of increasing barium, calcium and magnesium scale control activity of polyepoxysuccinic acid in an acidic aqueous system containing barium, calcium and magnesium and including metal ions comprising $Al^{+3}$ and $Fe_2O_3$ in concentrations sufficient to adversely effect said scale control activity which comprises adding a sufficient amount for the purpose of a metal ion binding agent selected from the group consisting of sodium tripolyphosphate, polyacrylic acid, citric acid, and tartaric acid to the aqueous system.

2. The method of claim 1 wherein said metal ion binding agent is selected from the group consisting of polyacrylic acid, citric acid and tartaric acid.

3. The method of claim 1 wherein said metal ion binding agent is added in amounts ranging from about 2 to about 50 parts per million parts of said aqueous system.

* * * * *